Aug. 6, 1940.   H. E. RAHN   2,210,217
LAWN MOWER
Filed Nov. 3, 1938   3 Sheets-Sheet 1

Inventor
H. E. Rahn
By Clarence A. O'Brien
and Hyman Berman
Attorneys

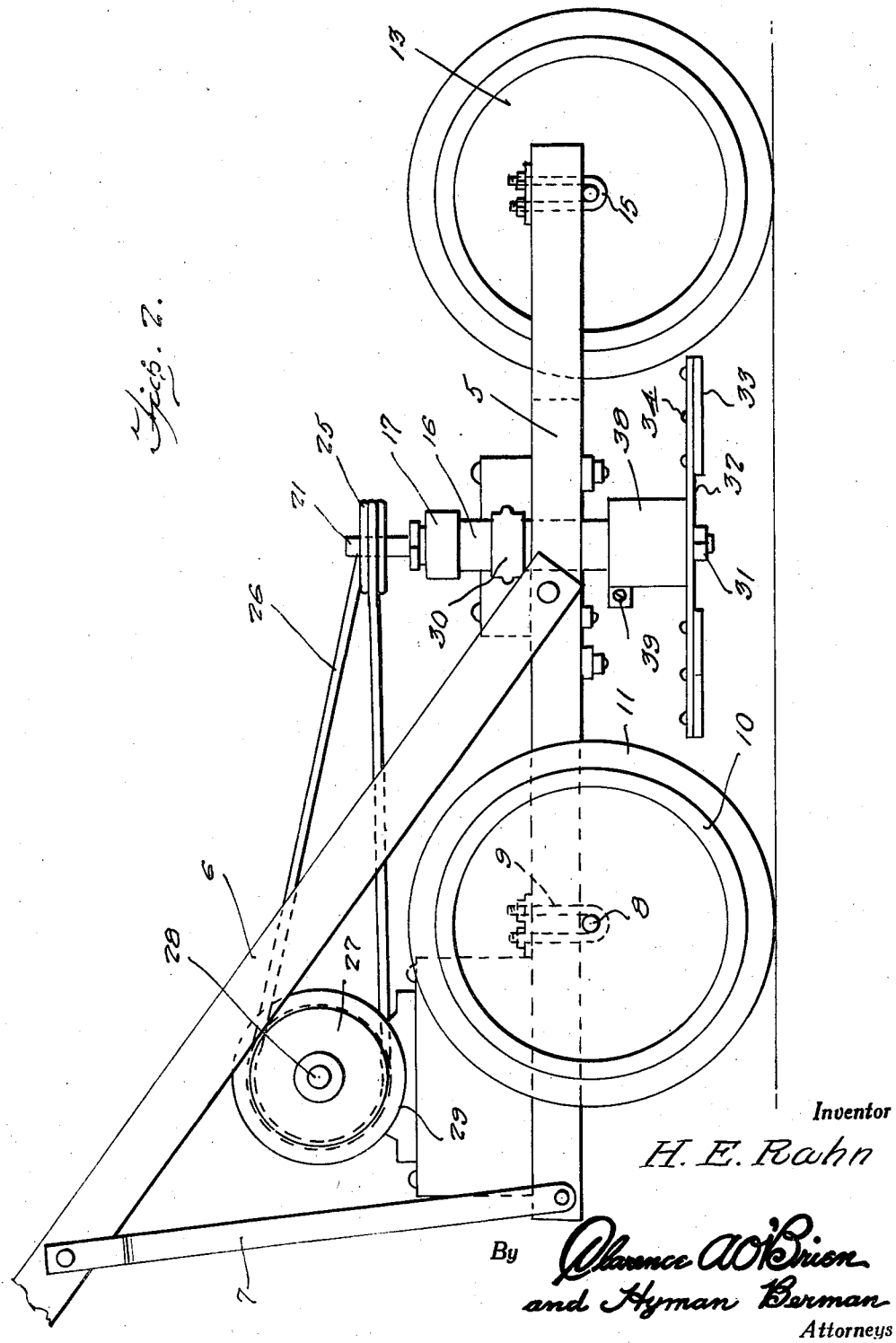

Aug. 6, 1940.   H. E. RAHN   2,210,217
LAWN MOWER
Filed Nov. 3, 1938   3 Sheets—Sheet 3
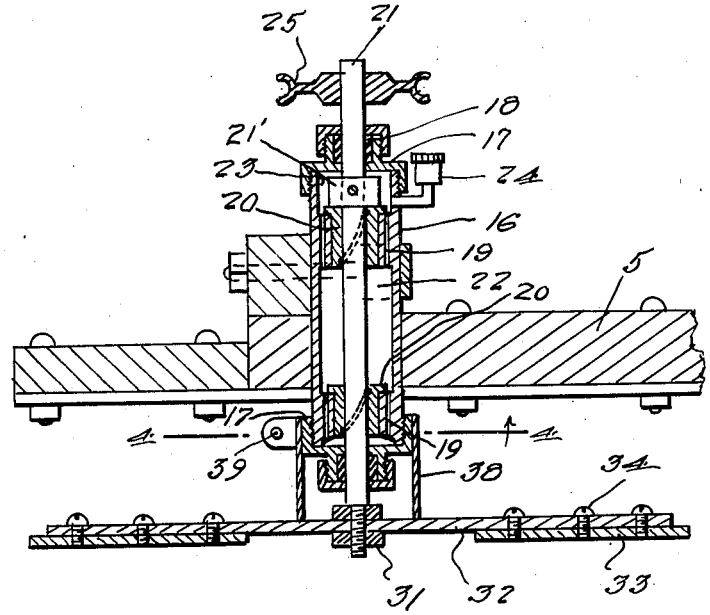
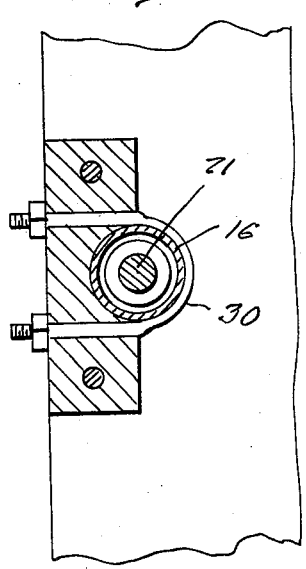
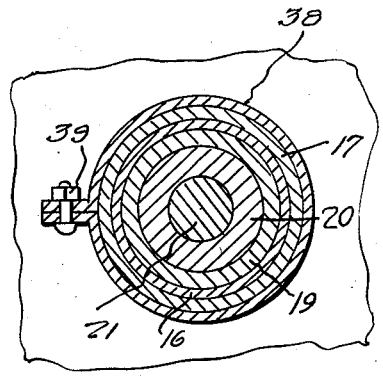
Inventor
H. E. Rahn
By Clarence A. O'Brien
and Hyman Berman
Attorneys Patented Aug. 6, 1940

2,210,217

UNITED STATES PATENT OFFICE 2,210,217

LAWN MOWER

Hugh E. Rahn, Burton, S. C.

Application November 3, 1938, Serial No. 238,697

1 Claim. (Cl. 308—134.1)

This invention relates to lawn mowers, and has for the primary object the provision of a device of this character which will be extremely easy to handle and will render grass cutting less tiring on the part of the operator and will permit cutting of grass close to walks, hedges, shrubbery, etc., and will be durable and economical to manufacture and maintain in operation and embodies power driven cutters rotatable about a vertical axis so that tall grass, weeds and other similar growth may be cut to a desired height from the ground.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a lawn mower constructed in accordance with my invention.

Figure 2 is a fragmentary side elevation illustrating the same.

Figure 3 is a vertical sectional view illustrating the mounting of the cutting mechanism, and showing the cutters carried thereby.

Figure 4 is a sectional view taken on the line 4—4 of Figure 3.

Figure 5 is a fragmentary horizontal sectional view illustrating the means of securing the mounting on the frame or platform of the mower.

Figures 1, 6:
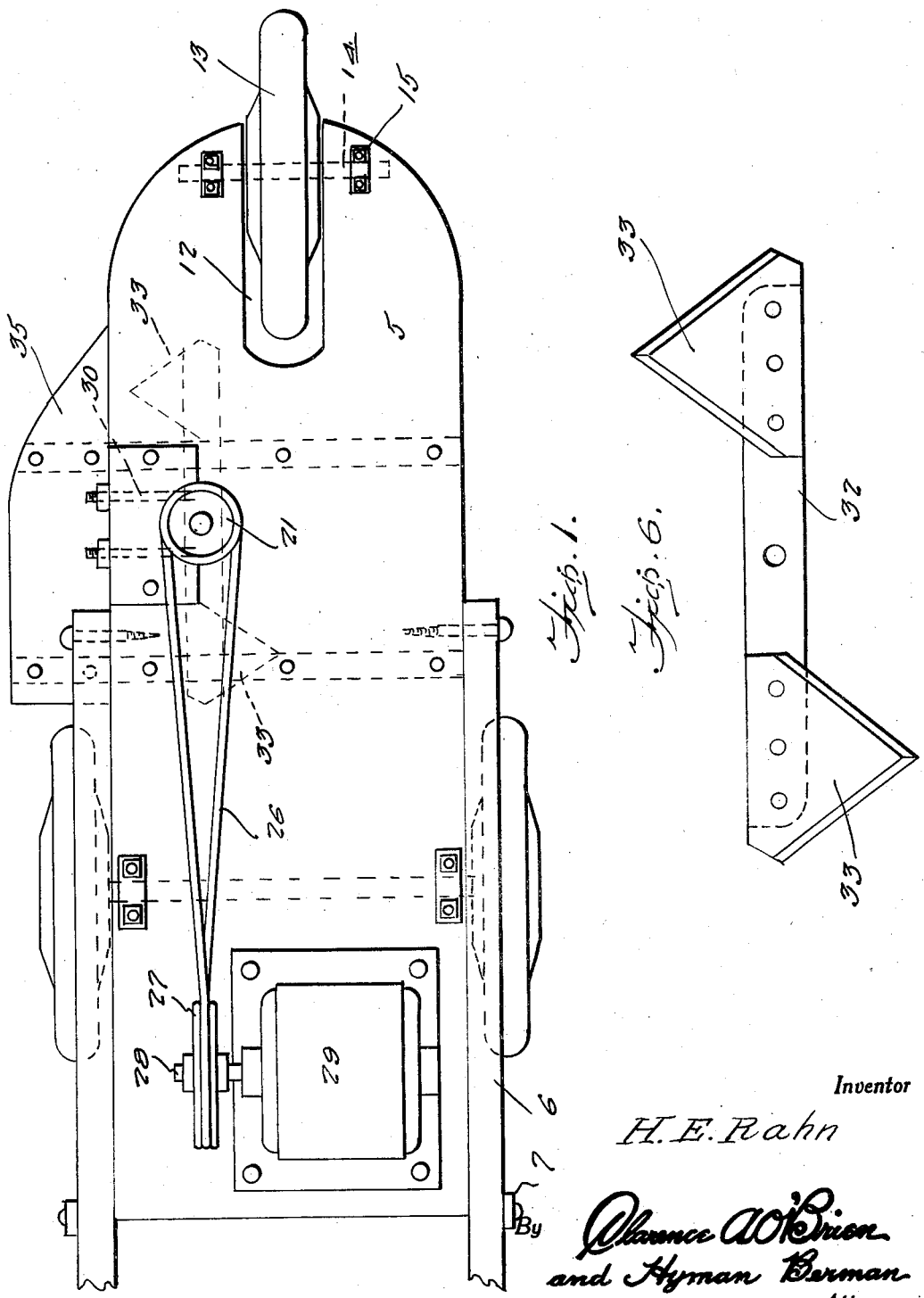
Figure 6 is a top plan view illustrating the cutter.

Referring in detail to the drawings, the numeral 5 indicates a frame or platform having secured to opposite sides thereof and extending rearwardly a pair of handles 6 braced through members 7 connected to said handles and to the platform or frame adjacent the rear end thereof.

A rear axle 8 is secured to the under side of the frame or platform adjacent the rear end thereof through the use of U bolts 9 and has journaled thereon rear wheels 10 preferably equipped with cushion tires 11. Further, it is preferable that the wheels be of the solid disc type.

The platform or frame is provided with a bifurcation or slot 12 in its forward end to receive a front wheel 13, the axle of which is indicated by the character 14 and is secured on the under face of the platform or frame by U bolts 15. Thus it will be seen that the frame or platform is equipped with two rear wheels and a single front wheel which will render the steering and handling of the mower comparatively easy as whenever it is desired to turn the mower sharply to the right or left, the operator may press downwardly on the handle to pivot the mower on the rear wheels.

The frame or platform adjacent to one side edge thereof is provided with an opening in which is mounted a vertically arranged sleeve 16, the upper and lower ends thereof being externally screw threaded to receive closure caps 17 which include in their construction packing glands 18. The sleeve 16 extends above and below the platform or frame 5 and has formed therein internal enlargements 19 forming supports for sleeve type bearings 20 in which is journaled a vertically arranged shaft 21 that extends through the cap 17 and the packing glands 18 thereof. An end thrust collar 21' is fast on said shaft 21 above the upper bearing 20 and engages the latter. The enlargements 19 form therebetween a lubricant chamber 22 also between the enlargements and the caps are lubricant chambers 23 having communication with each other by ports or passages formed in the enlargements and also the sleeve type bearings are provided with spirally formed lubricant grooves to permit the lubricant to flow through the sleeve type bearings into engagement with the shaft to thoroughly lubricate the latter and the sleeve type bearings. The uppermost lubricant chamber 23 is fed with a liquid type lubricant by a cup 24. During the rotation of the shaft 21 the lubricant will be caused to circulate upwardly and downwardly within the chambers 22 and 23 due to the spiral pitch of the lubricant grooves in the bearings 20, the lubricant feeding upwardly through said spirally formed grooves and flowing downwardly through the passages or ports provided in the enlargements 19. This lubricant due to friction will become heated during the rotation of the shaft which also aids in causing the lubricant to circulate upwardly through the chambers heretofore referred to.

The upper end of the shaft 21 has secured thereon a belt pulley 25 over which is trained an endless belt 26 and the latter is also trained over a pulley 27 secured on a shaft 28 of an electric motor 29 mounted on the platform or frame 5 adjacent the rear end thereof.

It is to be understood that the electric motor 29 may be connected to an electric output by the use of an extension cord (not shown).

The sleeve 16 is secured on the platform or frame through the use of a U bolt 30 and the lower end of the shaft 21 is reduced and screw threaded to receive thereon nuts 31. The nuts 31 are employed for securing on the shaft 21 for rotation therewith a cutter arm 32 on which are mounted cutters or blades 33 each of substantially triangular shape with the apex ends thereof extending in opposite directions to each other. The blades are detachably secured on the cutter arm 32 by screws or like fasteners 34. The blades 33 are arranged on the cutter arm to extend slightly beyond the ends of said cutter arm and the converging edges of said blades are sharpened so that during the rotation of the shaft 21 by the electric motor the blades will rotate about a vertical axis and will efficiently sever grass and other growth within the cutting radius of said blades. The blades operate under and to one side of the platform or frame as clearly shown in Figure 1.

A guard 35 is mounted on the platform or frame and is positioned to one side of the latter to overlie the blades as they move outwardly from under the platform or frame. The blades moving outwardly from under the platform or frame to one side as heretofore explained permits cutting of grass in close proximity to walks, hedges, shrubbery, etc.

A protecting sleeve 38 may be mounted on the lower end of the sleeve 16 and extend to the cutter arm 32, as clearly shown in Figure 3 to protect the lower stuffing gland on the sleeve 16 and is preferably of the split type including apertured ears to receive a bolt or like fastener 39 for clamping the guard sleeve 38 in position on the sleeve 16.

It is believed that the foregoing description, when taken in connection with the drawings will fully set forth the construction and advantages of this invention to those skilled in the art to which such a device relates, so that further detailed description will not be required.

Having described the invention, what is claimed is:

A mounting for attaching a rotary element to a lawn mower comprising a cylindrical sleeve-like casing adapted to be mounted on said mower in up-ended position, a pair of upper and lower cylinder heads fixed to opposite ends of said casing, respectively, and each including a stuffing box, a pair of upper and lower internal annular flanges in said casing spaced from each other and from said heads, respectively, a pair of upper and lower bearing members fitting in said flanges, respectively, and forming together therewith upper, lower and intermediate oil-containing chambers in said casing, a vertical shaft extending through said casing and bearings and having upper and lower ends extending through and beyond said boxes the lower end of the shaft being adapted for attachment of said element thereto, a collar fast on the shaft above the upper bearing and engaging the same, and a split cylindrical guard for the lower stuffing box and end of the shaft clamped around said lower end and extending to said element, said flanges and bearings being bored to permit oil to flow from the upper chamber into the intermediate and lower chambers.

HUGH E. RAHN.